United States Patent [19]

Hess et al.

[11] 4,222,106

[45] Sep. 9, 1980

[54] FUNCTIONAL CURVE DISPLAYING PROCESS AND APPARATUS

[75] Inventors: Heinz Hess, Weiterstadt; Horst Peth, Alsbach, both of Fed. Rep. of Germany

[73] Assignee: Robert Bosch GmbH, Stuttgart, Fed. Rep. of Germany

[21] Appl. No.: 928,519

[22] Filed: Jul. 27, 1978

[30] Foreign Application Priority Data

Jul. 30, 1977 [DE] Fed. Rep. of Germany ....... 2734465

[51] Int. Cl.[3] ........................ H04N 9/62; H07N 7/18; G06K 15/20

[52] U.S. Cl. ...................................... 364/521; 324/88; 340/805; 358/10; 358/139; 364/855

[58] Field of Search ......................... 364/521, 855, 88; 358/10, 139; 340/706, 709, 723, 744, 805, 814

[56] References Cited

U.S. PATENT DOCUMENTS

| | | | |
|---|---|---|---|
| Re. 28,507 | 8/1975 | Rush | 340/709 |
| 3,122,607 | 2/1964 | Balding | 340/805 |
| 3,145,378 | 8/1964 | Lyons, Jr. | 340/709 |
| 3,164,822 | 1/1965 | Uphoff | 340/744 |
| 3,649,819 | 3/1972 | Waller | 340/706 |
| 3,739,347 | 6/1973 | Forsberg | 340/709 |
| 3,906,197 | 9/1975 | Grover | 340/709 |
| 3,984,827 | 10/1976 | Hickin et al. | 364/855 |
| 4,068,310 | 1/1978 | Friauf | 364/521 |

*Primary Examiner*—Felix D. Gruber
*Attorney, Agent, or Firm*—Quaintance, Murphy & Richardson

[57] ABSTRACT

A process and two embodiments of an apparatus are disclosed for displaying, on the screen of a conventional home television receiver, curves illustrating analog signal potential functions of the form U(x,y). The process generally requires generating first and second saw-tooth signals synchronized with the vertical and horizontal sync. signals of the picture raster of the home television receiver. At least part of each of the signal potentials $U_y$ and $U_x$ are then compared with the first and second saw-tooth signals to generate first and second impulse signals respectively when equal potential conditions are observed. The first impulse signal is then differentiated with respect to time to form a gate impulse signal of adjustable width for controlling the processing of signal potential $U_x$. The second impulse signal is differentiated with respect to time to form a brightness control signal for output to the home television receiver.

16 Claims, 4 Drawing Figures

FUNCTIONAL CURVE DISPLAYING PROCESS AND APPARATUS

BACKGROUND OF THE INVENTION

1. Field of the Invention

The present invention relates generally to the methods and means for displaying curve patterns on the screen of a video display unit, such as the screen of a conventional home television receiver.

2. Background of the Invention

In the journal *Elektor,* December 1971, pages 1234–1242, an apparatus is disclosed for the generation of the potential pattern of a periodic signal on the cathode ray tube of a home television receiver operating according to the image raster process. In the disclosed device, a comparator is used to compare a horizontal frequency saw-tooth signal with a signal which is to be displayed. When an equal potential is reached, the electron beam of the cathode ray tube is scanned bright. However, in this operating mode, the potential pattern of the signal which is to be generated is rotated by 90°, that is, it is represented vertically. Furthermore, only signals having a frequency of less than the horizontal deflection frequency of the cathode ray tube of the home receiver can be reproduced in this manner.

Another circuit arrangement has been disclosed in German Patent Application No. P2638858 now U.S. Pat. No. 4,145,706 by which horizontal periods of a video signal can also be represented in the horizontal position of the cathode ray tube of a video display device. In this disclosure, a vertical frequency saw-tooth signal is fed into the comparator.

It is an object of the present invention to construct an improved device over the prior art which is capable of reproducing any curve pattern, for example vector illustrations, on the screen of a video display unit such as a conventional home television receiver.

SUMMARY OF THE INVENTION

In the present invention, an apparatus is provided for processing analog signal potentials which are of the form $U_x$ and $U_y$ so as to illustrate the functional curve U(x,y) on the screen of a conventional home television receiver. A first and second saw-tooth signal is generated which is synchronized with the vertical and horizontal sync. Signals of the picture raster of the cathode ray tube of the home receiver. At least part of each of the signal potentials $U_y$ and $U_x$ are compared with the first and second saw-tooth signals respectively and first and second impulse signals are generated when an equal potential condition is achieved. The first impulse signal is differentiated with respect to time to form a gate impulse signal of adjustable width which controls the processing of the signal potential $U_x$. A time differentiation of the second impulse signal forms a brightness control pulse signal for input to the television receiver.

In a first preferred embodiment of the inventive process, the gate pulse controls the period during which the second impulse signal is differentiated to form the brightness control pulse signal. In this embodiment, the width of the gate pulse is adjusted to correspond to approximately two horizontal sweep periods.

In a second embodiment, the second impulse signal comprises a plurality of signals, the number of signals corresponding to the maximum number of points to be displayed on any horizontal line, the number being determined by the gate impulse signal. In this embodiment, the gate impulse signal controls the storage of the signal potential $U_x$, and the pulse length of each second impulse signal is proportional to the stored value of the signal potential $U_x$.

In either embodiment the signal potentials and $U_y$ and $U_x$ can be derived from a coordinate generator. Further, the signal potentials $U_y$ and $U_x$ can be converted into digital address words which are stored or recorded, for example, on magnetic tape.

The process of the present invention has the advantage over the prior art that it is capable of reproducing any curve patterns, for example vector illustrations, on the screen of the video display unit of a home television receiver. Other features and advantages of the present invention will become apparent to those having ordinary skill in the art upon consideration of the following disclosure of preferred embodiments in connection with the accompanying figures.

DESCRIPTION OF PREFERRED EMBODIMENTS

Figure 1:
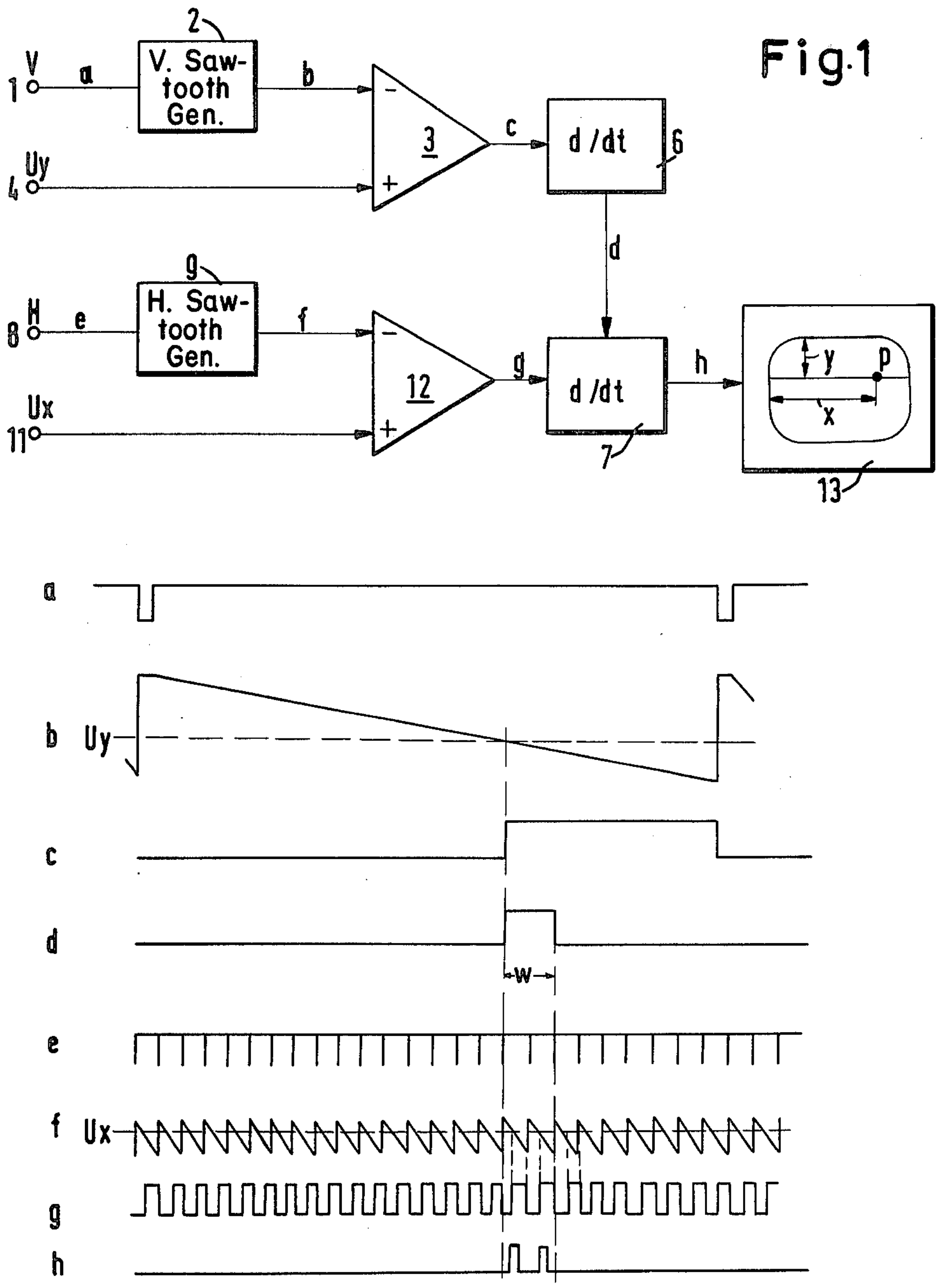
FIG. 1 is a block circuit diagram of one embodiment of the invention, together with the associated potential patterns.

In the circuit illustrated in FIG. 1, a vertical sync. signal a which is applied to terminal 1 is transformed into a vertical frequency saw-tooth signal b by means of a saw-tooth generator 2 and then fed into the inverted input of a comparator 3. At the non-inverted input of comparator 3, a signal potential $U_y$, for example a direct current, is applied through terminal 4.

An impulse signal c, the duration of the pulses of which is a function of the magnitude of the signal potential $U_y$, can be taken from the output of comparator 3. The impulse signal c is fed into a differentiating means 6 for differentiating the input signal with respect to time. The output of differentiating means 6 is a pulse d of adjustable width w. As illustrated, the width w of pulse d has been selected to approximately two horizontal line periods. The pulse d functions as a gate pulse on a second differentiating means 7 for differentiating with respect to time the impulse signal g formed by a horizontal frequency channel.

For the generation of impulse signal g, a horizontal sync. signal e is fed to terminal 8 and is transformed into a horizontal frequency saw-tooth signal f in the saw tooth generator 9. The saw-tooth signal f is fed into the inverted input of comparator 12, and, at the non-inverted input, a second signal potential $U_x$, for example a direct current, is applied through terminal 11. Impulse signal g can then be taken from comparator 12, the duration of the pulses of impulse signal g being a function of the magnitude of signal potential $U_x$.

The signal which can be taken from the output of differentiating means 7 thus occurs only during the duration of gate impulse d. The impulse signal h constitutes a brightness control pulse signal for input to the video display unit, which can be a conventional home television receiver 13. Through the intensity modulation of the electron beam, a point p is generated on the screen of the video display unit 13 whenever impulses h occur. The position of point p in the vertical direction y is a function of signal potential $U_y$ and the position in the horizontal direction x is a function of the signal potential $U_x$. In this manner, each image point of a screen can be clearly addressed by means of two coordinates. In the vertical direction, a specific line can be defined. In the horizontal direction, the locus is determined by a time distance x from the beginning of the line to the specific point P. In this manner, a vector generation on the screen of a video display unit is possible. While in the example given, the potentials $U_x$ and $U_y$ are given as direct current voltages, the illustration of time dependent potential functions is also possible, so long as those potential functions are continuous. In the case of $U(x,y)=f(t)$, a frequency response locus with respect to the corresponding functions results on the screen.

Figure 2:
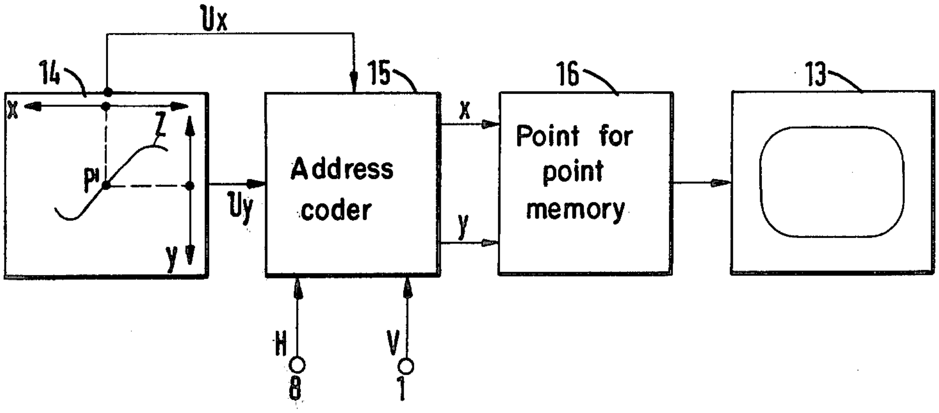
FIG. 2 is a block circuit diagram illustrating more generally an embodiment for the present invention.

The generation of any curve pattern, such as sketches, handwriting, and the like, also represents the generation of vectors which may be reproduced by the instant process. However, the coordinate potentials $U_x$ and $U_y$ are not here present, and they must be obtained from the various curve patterns. A circuit arrangement suitable for this purpose is illustrated in FIG. 2. In FIG. 2, a coordinate generator 14 generates the appropriate functions $U_x$ and $U_y$ in accordance with the requirements of the present invention. The point P' is one point illustrative of a curve pattern Z. The coordinates x and y can be presented by the coordinate generator 14 as potential-proportional or, in some other devices of the prior art, also time-proportional. If they are present in the time-proportional form, they can be transformed into digital address words by appropriate counting circuits which count the vertical lines and count a horizontal frequency-coupled timing frequency to determine position of point P'. This transformation takes place in an address coder 15, which would additionally contain the principal circuit according to FIG. 1.

A storage unit 16 which makes a storage location available for each point can now be controlled point for point with the coordinates x and y. The output potential of this storage 16 can then control the electron beam of the video display unit 13 when additionally processed by the circuit according to FIG. 1. With this method, it is possible to generate a pattern of complex lines by following the coordinate generator 14 with the interposition of a storage means 16.

On the basis of normal timing frequencies, a read-in speed of one image point per field results with this direct method of a writing speed of approximately 50 or 60 points per second, depending upon which television standard is complied with. An "electronic erasure" corresponds simply to a point-wise clearing of the information stored in storage means 16. A change of scale of the image corresponds to a proportional change in the coordinate potentials. A positional shift is possible by the addition of a direct current to either of the potential $U_x$ or $U_y$. Finally, because the speed of change of the coordinate potentials is low, sketches, vector diagrams and the like can be stored on a cassette recorder or the like with a simple recording of the potential function of the brightness control pulse signal.

Figure 3:
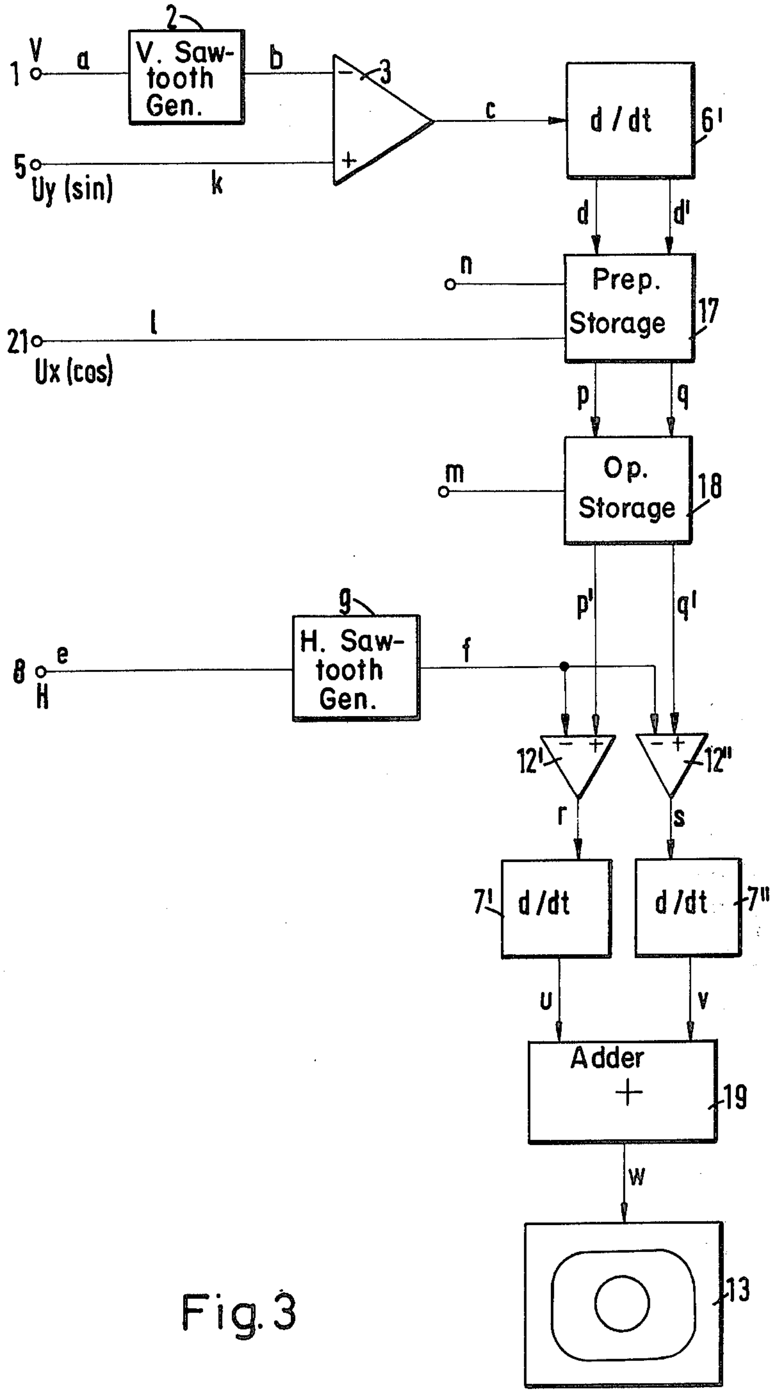
FIG. 3 is a block circuit diagram of another embodiment of the present invention.

While the writing speed of 50 or 60 points per second is satisfactory in many circumstances, in certain instances higher writing speed characteristics are desired or would be convenient. While this can be increased by increasing both the image frequency and line frequency, such a solution is not reasonably practical, and other means are thought to achieve the same result. In FIG. 3, an alternative embodiment of the present invention is illustrated wherein circuit components having similar functions as the circuit illustrated in FIG. 1 continues to bear the same numbers. The circuit of FIG. 3 is illustrated as a two-channel displaying processor, but it will be appreciated by those having ordinary skill in the art that the number of channels is not thereby limited, and that if extremely complex vector oscillograms are to be plotted, more than two-channel circuit units must be provided. With the use of integrated circuits and the like, the multiplication of channels of identical function is easily achieved within reasonable economic limits.

Figure 4:
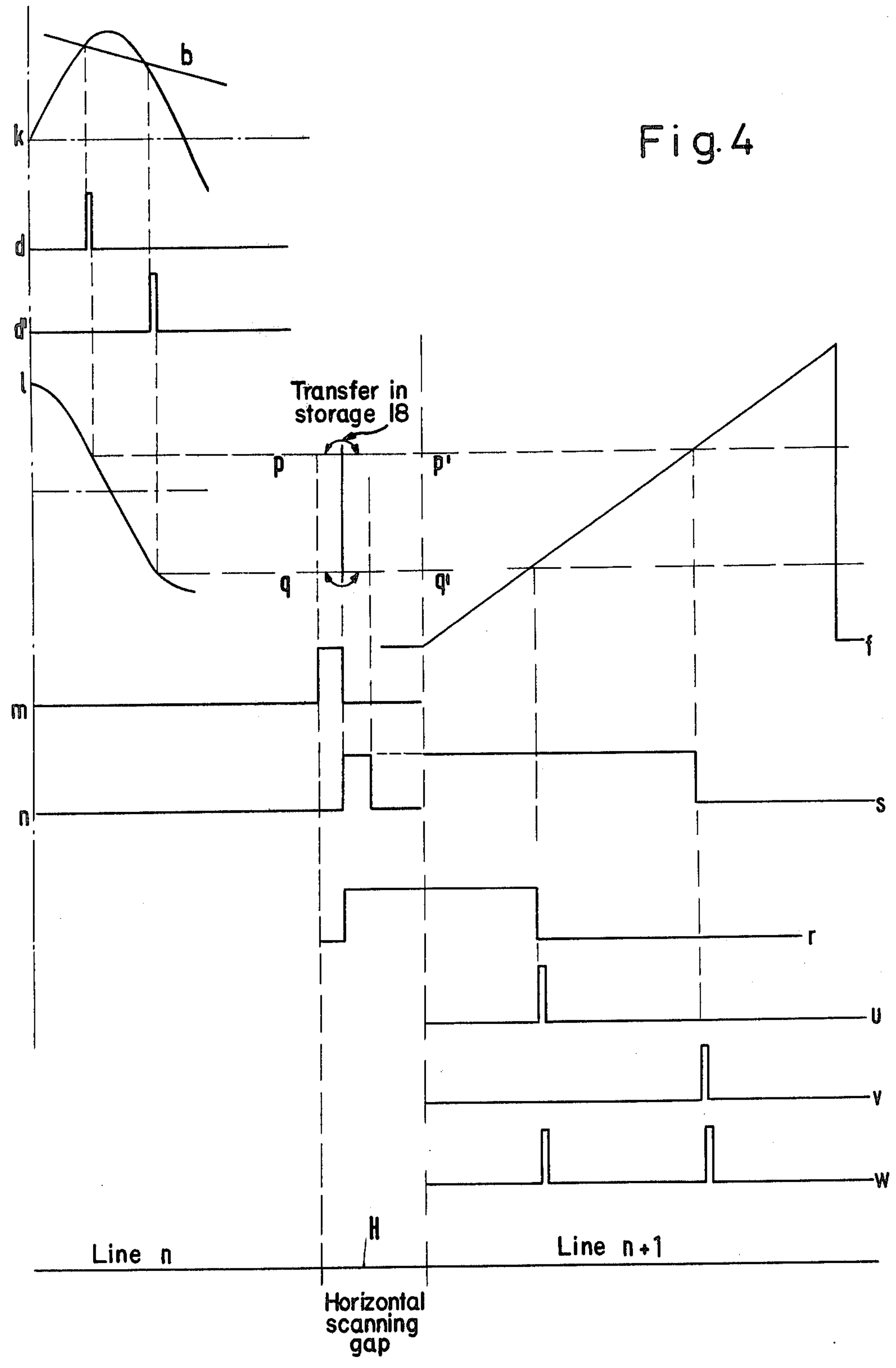
FIG. 4 shows the potential patterns of signals occurring in the circuit illustrated in FIG. 3.

The basic addition to the circuit, as illustrated in FIGS. 3 and 4, is the presence of two storage means, namely a preparation storage means 17 and an operating storage 18 as well as an addition stage 19 the diagrams of FIG. 4 are time vs. voltage curves wherein the letters used therewith identify various lettered points on the circuit of FIG. 3. The vertical frequency saw-tooth signal b and, through terminal 5, the signal potential $U_y$, here assumed to be a sine-shaped signal k, are fed into comparator 3. A first impulse signal c output from comparator 3 is then differentiated with respect to time at the leading and trailing edge to form impulse signals d, d' which act as gating or sampling pulse signals. The pulse signals d, d' characterize the intersection points of the input signal $U_y$ and the vertical saw-tooth signal c.

The gating impulse signals d, d' are then applied to the preparation storage means 17 to permit it to record the prevailing momentary value of the potential signal $U_x$. In the succeeding horizontal scanning gap, the particular potentials p, q, are transferred from the preparation storage means 17 to the operating storage means 18 when transfer impulse m occurs. The erasure of the information in the preparation storage means 17 then takes place by means of an erasure impulse n so as to make the entire storage means 17 available for recording the potential values in the next succeeding unit of time. The information now stored in operating storage means 18 is the prevailing momentary potential value of the signal $U_x$ at the instants in time of pulses d, d' and now indicated to be potential values p', q'.

In comparators 12', 12'', the potential values p', q' are now compared with the horizontal frequency saw-tooth signal f which is generated by the saw-tooth generator 9. This comparison results in impulse signals r, s, the pulse length of each signal being proportional to the associated potential values p', q'. The trailing edges of impulses r, s are differentiated with respect to time in the differentiating means 7', 7'', so that the vector impulses u, v are generated at the output. These impulses u, v, are added in addition stage 19, and are fed into the video display unit 13 as a brightness control pulse signal w. As illustrated, the input of a sine function for $U_y$ and a co-sine function $U_x$ results in the illustration of a circle on the cathode ray tube of the television receiver. In the representation of a circle, it is recognized that a maximum of two points per line would occur. For more complex vector oscillograms to be plotted, more than two circuit units must be provided.

The specific differentiation refered to is shown in U.S. Pat. No. 4,145,706 to Hess et al which is incorporated herein by reference.

While the present invention has been described with relation to certain preferred embodiments, it will be appreciated that various modifications can be made which are understood to be within the scope of the appended claims, and that the invention may be practiced other than as specifically described herein.

What is claimed is:

1. A process for displaying, on the screen of a conventional home television receiver, curves illustrating analog signal potentials of the form U(x,y) comprising the steps of:

generating first and second saw-tooth signals in response to vertical and horizontal sync signals of the picture raster, comparing at least part of each of the signal potentials $U_y$ and $U_x$ with the first and second saw-tooth signals respectively, and generating first and second impulse signals respectively when an equal potential condition is achieved, differentiating the first impulse signal with respect to time to form a gate impulse signal of adjustable width for controlling the processing of signal potential $U_x$, and differentiating the second impulse signal with respect time to form a brightness control impulse signal for input to the television receiver.

2. The process of claim 1 wherein said gate pulse controls the period during which the second impulse signal is differentiated to form said brightness control pulse signal.

3. The process of claim 2 wherein the width of said gate pulse is adjusted to correspond to approximately two horizontal sweep periods.

4. The process of claim 1 wherein the signal potentials $U_y$ and $U_x$ are derived from a coordinate generator.

5. The process of claim 4 wherein the signal potentials $U_y$ and $U_x$ are converted into digital address words and are stored.

6. The process of claim 5 wherein the stored signal values serve to control the brightness of said screen.

7. The process of claim 5 wherein the stored signal values are recorded on magnetic tape.

8. The process of claim 1 wherein said second impulse signal comprises a plurality of peaks, the number of second impulse signals corresponding to the maximum number of points to be displayed on any one horizontal line, the number being determined by the width of said gate impulse signal.

9. The process of claim 8 wherein said gate impulse signal controls the storage of signal potential $U_x$ and wherein the pulse length of each second impulse signal is proportional to the stored value of the signal potential $U_x$.

10. A process for displaying, on the screen of a conventional home television receiver, curves illustrating analog signal potentials $U_x$ and $U_y$ comprising the steps of:

generating first and second saw-tooth signals in response to the vertical and horizontal sync signals of the picture raster, comparing the signal $U_y$ and $U_x$ with the first and second saw-tooth signals respectively, and generating first and second impulse signals respectively when an equal potential condition is achieved, differentiating the first impulse signal with respect to time to form a gate impulse of adjustable width, and differentiating the second impulse signal with respect to time only during the gate impulse to form a brightness control pulse for input to the television receiver.

11. The process of claim 10 wherein the width of said gate impulse is adjusted to correspond to approximately two horizontal sweep periods.

12. The process of claim 10 wherein the brightness control pulse signal is stored in digital storage.

13. The process of claim 12 wherein the brightness control pulse signal is recorded on magnetic tape.

14. A process for displaying, on the screen of a conventional home television receiver, curves illustrating analog signal potentials $U_x$ and $U_y$ comprising the steps of:

generating a first saw-tooth in response to the vertical sync singla of the picture raster, comparing the signal potential $U_y$ with the first saw-tooth signal and generating a first impulse signal when an equal potential condition exists, differentiating the first impulse signal with respect to time to form a gate signal-of-adjustable-width, sampling the potential value of signal potential $U_x$ with the gate impulse signal, transferring with each horizontal sync pulse the storage potential values of $U_x$ point for point, to an operating storage means, generating a second saw-tooth signal in response to the horizontal sync signal, comparing the stored potential values of $U_x$ with the second saw-tooth signal and generating a second impulse signal for each stored potential value of $U_x$, the pulse rate being proportional to the potential value stored, and differentiating the second impulse signals with respect to time to form a brightness control pulse signal for input to the television receiver.

15. An apparatus for use with a conventional home television receiver for displaying thereon curves illustrating analog signal potentials $U_y$ and $U_x$ comprising:

first and second saw-tooth signal generators synchronized with the vertical and horizontal sync signals of the picture raster respectively, first and second voltage comparaters, a first input at each being connected to the outputs of the first and second signal generators respectively, the second input of each receiving analog potentials $U_y$ and $U_x$ respectively, first and second differentiating means for respectively differentiating the output of the first and second voltage comparaters with respect to time, the output of the first differentiating means connected to a gate on the second differentiating means to thereby control the operation thereof, the output of the second differentiating means comprising a brightness control pulse signal for input to the television receiver.

16. An apparatus for use with a conventional home television receiver for displaying thereon curves illustrating analog signal potentials $U_y$ and $U_x$ comprising:

first and second saw-tooth signal generators synchronized with the vertical and horizontal sync signals of the picture raster respectively, a first voltage comparater, a first input of which is connected to the output of the first signal generator, the second input of which receives the analog potential $U_y$, a first differentiating means for differentiating the output of the first voltage comparater with respect to time thereby generate at least one gate pulse signal, a first storage means responsive to said at least one gate pulse signal for storing the momentary potential values of potential signal $U_x$ occurring during each of said at least one gate pulse signals, a second storage means responsive to each horizontal sync pulse signal for receiving each stored potential of $U_x$, point for point, from said first storage means, a second saw-tooth signal generator synchronized with the horizontal sync signal of the picture raster, a plurality of second voltage comparater means, a first input of each being connected to the second saw-tooth generator, the second input of each receiving only one of the stored potential values from the second storage means to thereby generate at the output of each voltage comparater only one pulse, the length of which corresponds to the particular stored potential value compared, a plurality of second differentiating means each connected to the output of one second voltage comparater for differentiating each pulse with respect to time, the sum of the output of the second differentiating means comprising a brightness control pulse signal for input to the television receiver.

* * * * *